(12) United States Patent
Silva et al.

(10) Patent No.: US 11,030,413 B2
(45) Date of Patent: Jun. 8, 2021

(54) RECOMMENDING MESSAGE WORDING BASED ON ANALYSIS OF PRIOR GROUP USAGE

(71) Applicant: International Business Machines Corporation, Armonk, NY (US)

(72) Inventors: Asima Silva, Holden, MA (US); Hernan A. Cunico, Holly Springs, NC (US); John Rice, Waterford (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 16/019,999

(22) Filed: Jun. 27, 2018

(65) Prior Publication Data
US 2020/0004818 A1    Jan. 2, 2020

(51) Int. Cl.
| | |
|---|---|
| G06F 40/30 | (2020.01) |
| G06F 40/253 | (2020.01) |
| G06F 40/284 | (2020.01) |
| H04L 12/58 | (2006.01) |
| G06F 16/28 | (2019.01) |
| H04L 29/08 | (2006.01) |

(52) U.S. Cl.
CPC ............ *G06F 40/30* (2020.01); *G06F 16/285* (2019.01); *G06F 40/253* (2020.01); *G06F 40/284* (2020.01); *H04L 51/32* (2013.01); *H04L 67/10* (2013.01)

(58) Field of Classification Search
CPC combination set(s) only.
See application file for complete search history.

(56) References Cited

U.S. PATENT DOCUMENTS

| | | | |
|---|---|---|---|
| 9,165,329 B2 * | 10/2015 | Beechum | ............... G06Q 50/01 |
| 9,244,905 B2 | 1/2016 | Joshi et al. | |
| 2009/0157614 A1 | 6/2009 | Smith et al. | |
| 2012/0297317 A1 * | 11/2012 | Radom | ................. G06F 3/0237 |
| | | | 715/752 |

(Continued)

OTHER PUBLICATIONS

Wade Shaddy, "Downhill Mountain Biking Risks—Are They Worth It?", I Love Bicycling, http://www.ilovebicycling.com/downhill-mountain-biking-risks-are-they-worth-it/, Feb. 23, 2016.

*Primary Examiner* — Linda Wong
(74) *Attorney, Agent, or Firm* — North Shore Patents, P.C.; Joseph L Acayan

(57) ABSTRACT

Embodiments generally relate to recommending message wording in a collaboration environment. In some embodiments, a method includes monitoring content characteristics of messages provided by users in a collaboration environment, where the content characteristics include individual usage statistics. The method further includes aggregating the individual usage statistics. The method further includes determining group usage statistics from the aggregated individual usage statistics. The method further includes determining community characteristics based at least in part on the group usage statistics. The method further includes providing one or more recommendations to at least one user who writes at least one new message based at least in part on the community characteristics and based at least in part on one or more recommendation policies.

20 Claims, 6 Drawing Sheets

(56) References Cited

U.S. PATENT DOCUMENTS

| | | | |
|---|---|---|---|
| 2013/0046791 A1* | 2/2013 | Markman | G06F 16/367 |
| | | | 707/794 |
| 2013/0047099 A1 | 2/2013 | Markman et al. | |
| 2014/0280638 A1 | 9/2014 | O'Dell et al. | |
| 2015/0046527 A1 | 2/2015 | Bank et al. | |
| 2016/0034562 A1* | 2/2016 | Malcolm-Dacosta | |
| | | | H04L 51/12 |
| | | | 707/740 |
| 2016/0088499 A1* | 3/2016 | Logan | H04L 1/24 |
| | | | 370/242 |
| 2016/0094646 A1* | 3/2016 | Spivack | H04L 67/1042 |
| | | | 709/204 |
| 2016/0196561 A1* | 7/2016 | Iyer | G06Q 30/016 |
| | | | 705/304 |
| 2016/0330156 A1* | 11/2016 | Dunne | H04L 51/04 |
| 2016/0344754 A1* | 11/2016 | Rayapeta | H04L 63/1416 |
| 2018/0075024 A1* | 3/2018 | Leydon | G06F 40/263 |
| 2018/0115630 A1* | 4/2018 | Zheng | H04L 67/22 |
| 2018/0205691 A1* | 7/2018 | Osipkov | G06Q 10/107 |
| 2018/0357303 A1* | 12/2018 | Tomkins | G06F 16/35 |
| 2019/0158610 A1* | 5/2019 | Holzband | H04L 67/22 |
| 2019/0364001 A1* | 11/2019 | Dotan-Cohen | G06Q 10/107 |
| 2020/0084055 A1* | 3/2020 | Brunn | G06Q 10/04 |

\* cited by examiner

|  | User A | User B |
|---|---|---|
| Punctuation | 8 | 9 |
| Lexicon | 6 | 7 |
| Grammar | 8 | 8 |
| Spelling | 10 | 8 |
| Religion | 0 | 0 |
| Swearing | 0 | 0 |
| Slang | 4 | 0 |

| | |
|---|---|
| Collaboration Type Taxonomy | "Cycling" |
| Aggregated Match To Exemplar | http://www.ilovebicycling.com/downhill-mountain-biking-risks-are-they-worth-it/ |
| Likely Destination | City Cycling Club and Wiki |
| Proximate Content Style | Casual |
| Proximate Documents Analyzed | 8,990 |
| Collaboration Threshold Real-time Monitoring | 93% |
| Recommendation | Send Dialogue for "This sentence should be more formal because this content will likely be saved for viewing in the Cycling wiki XYZ." |
| Statistical Likelihood | 96% |
| User ID | User 59 |

RECOMMENDING MESSAGE WORDING BASED ON ANALYSIS OF PRIOR GROUP USAGE

BACKGROUND

Collaborative applications provide a way for two or more individuals to communicate electronically. These applications use a workspace of channels to organize content, and everyone on those channels may have the same level of visibility and exposure to the content. However, these applications have various drawbacks. For example, often times, collaborative communities and private messaging are used in parallel, and matters discussed separately in a private chat session end up posted in a community or collaborative space. A problem is that the norms that apply to the community might be different to the ones used in those separate, private conversations. Currently, inappropriate language used in communities is corrected by trial and error, where users receive warnings until they correct their use of language. Consequently, language used in private conversations may be inappropriate in conversations view by the larger community.

SUMMARY

Disclosed herein is a method for recommending message wording based on analysis of prior group usage in a collaboration environment, and a system and computer program product as specified in the independent claims. Embodiments are given in the dependent claims. Embodiments can be freely combined with each other if they are not mutually exclusive.

In some embodiments, a method includes monitoring content characteristics of messages provided by users in a collaboration environment, where the content characteristics include individual usage statistics. The method further includes aggregating the individual usage statistics. The method further includes determining group usage statistics from the aggregated individual usage statistics. The method further includes determining community characteristics based at least in part on the group usage statistics. The method further includes providing one or more recommendations to at least one user who writes at least one new message based at least in part on the community characteristics and based at least in part on one or more recommendation policies.

In another embodiment, the community characteristics are further based at least in part on one or more of a destination. In another aspect, the individual usage statistics include statistics associated with one or more of punctuation, lexicon, grammar, spelling, religion, swearing, and slang. In another aspect, the community characteristics are further based at least in part on a collaboration type. In another aspect, at least one of the recommendation policies is to flag inappropriate wording detected in the new message. In another aspect, at least one of the recommendation policies is to suggest appropriate wording in the at least one new message. In another aspect, at least one of the recommendation policies is to suggest appropriate wording based on the community characteristics.

BRIEF DESCRIPTION OF THE DRAWINGS

FIG. 4 is a table showing example individual usage statistics, according to some embodiments.

FIG. 5 is a table showing example community characteristics, according to some embodiments.

DETAILED DESCRIPTION

Embodiments described herein recommend message wording based on analysis of prior group usage in a collaboration environment. Embodiments improve real-time collaboration among users in a collaboration environment by learning the expected behavior of users in the collaboration environment.

As described in more detail herein, a system determines the communication patterns, cultural norms, and purpose of a given community or collaboration environment. The system also determines the purpose, topic, and tone of separate conversations that occur within the collaboration environment. Private conversations often use informal language. As such, if posted in a more formal community space, an informal message may not reflect well. The system provides recommendations to users where needed in order to make conversations suitable for the corresponding community of the collaboration environment.

In some embodiments, a system monitors content characteristics of messages provided by users in a collaboration environment, where the content characteristics include individual usage statistics. The system aggregates the individual usage statistics and determines group usage statistics from the aggregated individual usage statistics. The system then determines community characteristics based at least in part on the group usage statistics. The system then provides one or more recommendations to at least one user who writes at least one new message based at least in part on the community characteristics and based at least in part on one or more recommendation policies.

Figure 1:
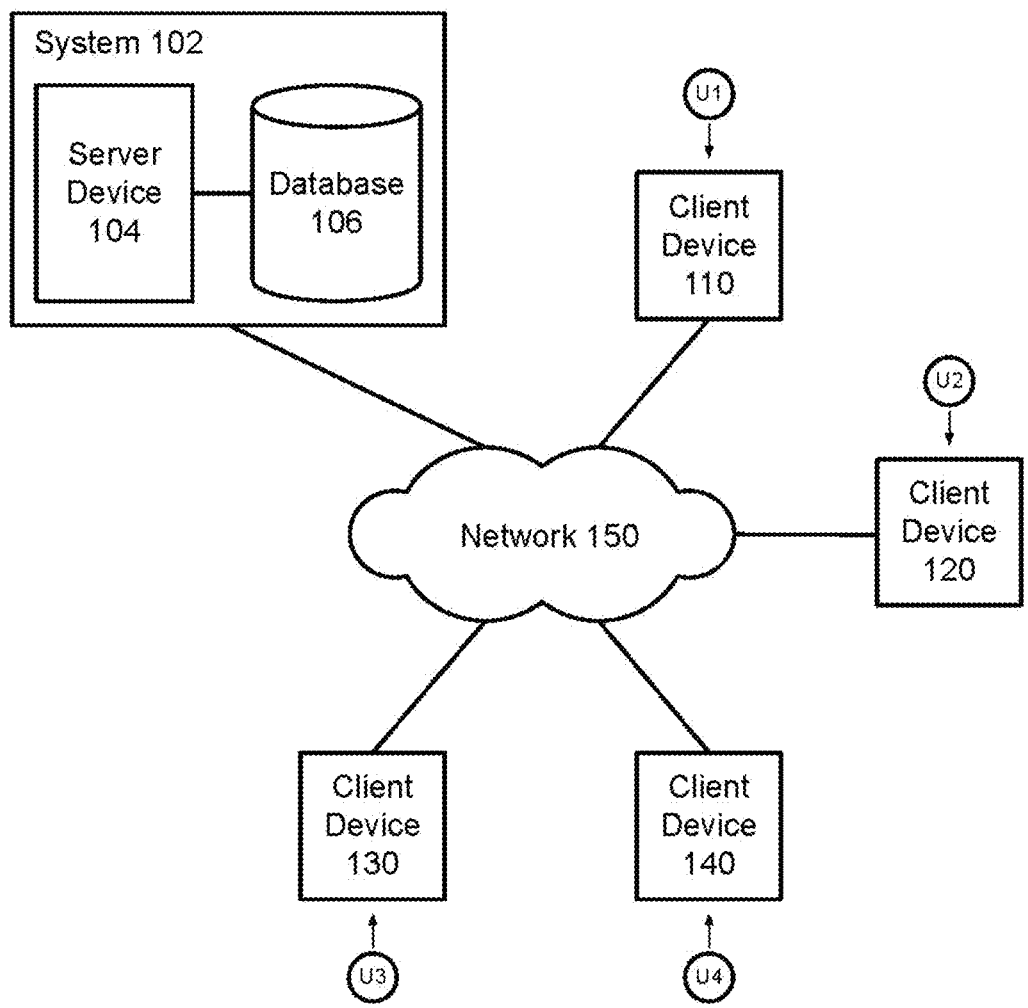
FIG. 1 is an example environment, according to some embodiments.

FIG. 1 is an example collaboration environment 100, according to some embodiments. Shown is a system 102, which includes a server device 104 and a database 106. In various embodiments, system 102 and client devices 110, 120, 130, and 140 may communicate with each other via wired and/or wireless connections associated with any suitable network such as network 150 or combination of networks.

In various embodiments, system 102 provides a collaboration environment or workspace where two or more individuals communicate and collaborate electronically. The terms collaborative environment and collaboration environment may be used interchangeably. System 102 provides a collaboration environment or workspace that includes multiple communication channels that enable users to communicate with each other on various topics. As indicated above, each communication channel may be a group chat, a thread in a forum, a space for uploading and accessing documents, etc. Each communication channel is associated with a different topic, and users on those channels collaborate via the respective communication channels. Users may post content and messages on the various communication channels. System 102 enables users to organize the content and messages on the communication channels.

As described in more detail herein, system 102 recommend message wording based on analysis of prior group usage in a collaboration environment by intelligently determining communication patters, including expected behaviors and cultural norms in a community or collaboration environment. Over time the system learns the probably destination of the message, and behavior of the conversations such that when new users join the community and start contributing, the system can recommend and promote message wording that comply with expected norms and behaviors of that community. While various embodiments are described herein in the context of a collaboration environment, these embodiments and others also apply to other types of social platforms. Other types of social platforms may include any platform or online communities for sharing of content, adding friends, etc. Further example embodiments and operations of collaboration environment 100 are described in more detail herein.

While server 102 performs embodiments described herein, in other embodiments, any suitable component or combination of components associated with the server 102 or any suitable processor or processors associated with server 102 may facilitate performing the embodiments described herein. In various embodiments, environment 100 may not have all of the components shown and/or may have other elements including other types of components instead of, or in addition to, those shown herein.

For ease of illustration, FIG. 1 shows one block for each of system 102, server device 104, and database 106, and shows four blocks for client devices 110, 120, 130, and 140. Blocks 102, 104, and 106 may represent multiple systems, server devices, and databases. Also, there may be any number of client devices. In other implementations, environment 100 may not have all of the components shown and/or may have other elements including other types of elements instead of, or in addition to, those shown herein. In various implementations, users U1, U2, U3, and U4 may interact with each other in the collaboration environment and/or interact with system 102 using respective client devices 110, 120, 130, and 140. In other implementations, there may be two to any number of users in the collaboration environment and/or interacting with system 102.

Figure 2:
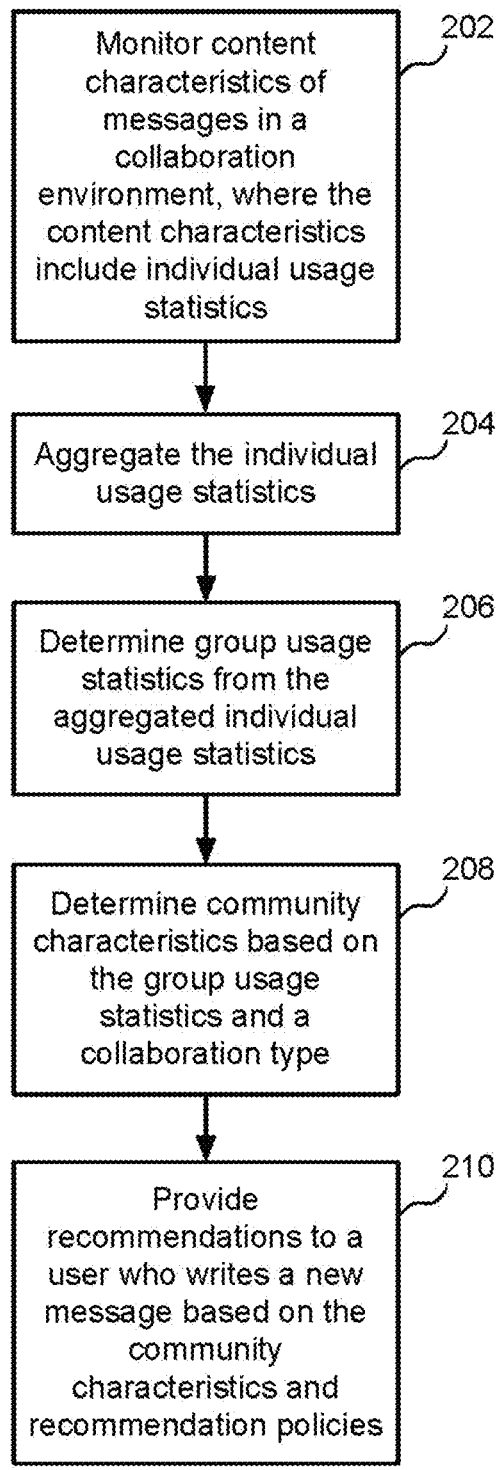
FIG. 2 is an example flow diagram for recommending message wording in a collaboration environment, according to some embodiments.

FIG. 2 is an example flow diagram for recommending message wording in a collaboration environment, according to some embodiments. As described in more detail herein, embodiments recommend message wording based on analysis of prior group usage. Referring to both FIGS. 1 and 2, a method begins at block 202, where a system such as system 102 monitors content characteristics of messages provided by users in a collaboration environment. As described in more detail herein, in various embodiments, the content characteristics include individual usage statistics. In various embodiments, messages include communication exchanges between two or more users, and such messages may be in various forms. For example, messages may be in the form of an email conversation, an email string of messages, text messages, chat conversation of messages, etc. The term "conversation" may refer to emails, texts, and/or chats. In some embodiments, messages may also include documents. For example, messages may have documents attached. As such, while some embodiments are described in the context of messages, these embodiments and others also apply to documents. For example, some users may upload documents to the system. As such, when determining content characteristics of messages, the system may also determine content characteristics of documents. These documents may be attached to messages and/or may be independently uploaded to the system.

The following describes components of the system that perform the monitoring of content characteristics of messages as well as perform other embodiments described herein.

Figure 3:
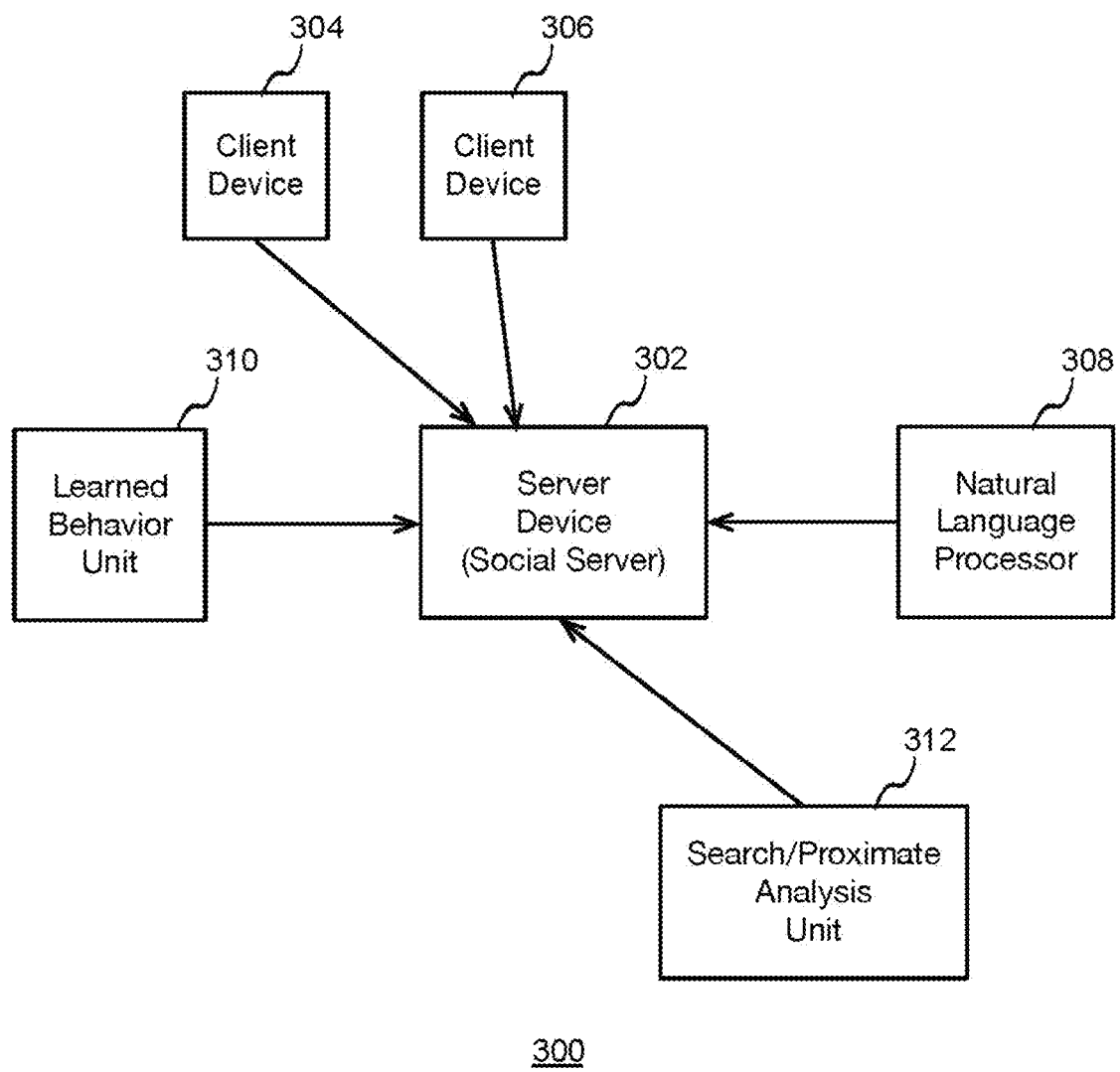
FIG. 3 is an example block diagram of components of a collaboration environment, according to some embodiments.

FIG. 3 is an example block diagram of components of a collaboration environment 300, according to some embodiments. Shown are a server device 302, client device 304, client device 306, natural language processor 308, learned behavior unit 310, and search/proximate analysis unit 312. In some embodiments, server device 302 may be used to implement server device 104 of FIG. 1. Also, one or more of natural language processor 308, learned behavior unit 310, and search/proximate analysis unit 312 may reside at system 102 of FIG. 1 or may be accessible by system 102.

In various embodiments, server device 302 of the system monitors content characteristics of messages provided by users in a collaboration environment or other social platform. In various embodiments, server device 302 may be a social server that is associated with and/or loaded onto a social platform.

In some embodiments, server device 302 of the system receives messages from client devices such as client devices 304 and 306. Natural language processor 308 of the system monitors and tracks content-related behavior, and provides the content-related behavior to server device 302. The system may build a simple log of the content-related behavior, including content being posted. The log may be stored at database 106 of FIG. 1 or at another suitable storage location. Learned behavior unit 310 of the system learns the communication patterns, norms, and behaviors of different forums, communities, and any other collaboration space, and provides information associated with the communication patterns, norms, and behaviors to server device 302. Search/proximate analysis unit 312 performs searches and proximate analysis. In some embodiments, search/proximate analysis unit 312 analyzes the likely end destination of the message or studied content (the content of interest). For example, search/proximate analysis unit 312 may determine that Content A will likely be stored in approximately 3 weeks in Repository B), View 3, and fairly close to Document 3, Document 4, and Document 5. As such, search/proximate analysis unit 312 may perform an analysis of View 3, Document 3, Document 4, and Document 5 in order to determine content characteristics of View 3, Document 3, Document 4, and Document 5.

In various embodiments, the system determines the individual users of the collaboration environment. The system monitors and learns the behavioral patterns of each user. The behavioral patterns associated with a given user may include the content characteristics associated with the user, including the individual usage statistics of the user. In various embodiments, the individual usage statistics may include statistics associated with one or more of punctuation, lexicon, grammar, spelling, religion, swearing, and slang. The particular types of individual usage statistics may vary, and will depend on the particular implementation. For example, in some embodiments, individual usage statistics may include statistics on group affiliations, age-appropriate language, etc.

FIG. 4 is a table 400 showing example individual usage statistics, according to some embodiments. Shown are User A and User B. For ease of illustration, two users are shown. The number of users tracked may vary, and will depend on the particular implementation. For each user, the system monitors and tracks various usage statistics. Shown are punctuation, lexicon, grammar, spelling, religion, swearing, and slang. Other usage statistics are possible and will vary, depending on the particular implementation. In various embodiments, table 400 includes real-time usage statistics, which may be provided by search/Proximate analysis unit 312.

In some embodiments, the behavioral patterns associated with a given user may also include other content-related behavior associated with the user. In various embodiments, content-related behavior may include various activity information associated with messaging and/or posts. For example, such activity information may include identification of which conversations a given user gets involved in. Activity information may also include which other users that the user interacts with. Activity information may also include what topics the user is associated with. Activity information may also include what actions the user takes with regard to messages or posts. The system monitors and keeps track of the flow from the user's conversations in the collaboration environment and in any other related social platform.

At block 204, the system aggregates the individual usage statistics. In various embodiments, server device 302 of the system may perform the aggregation step.

At block 206, the system determines group usage statistics from the aggregated individual usage statistics. In various embodiments, server device 302 of the system may perform this step of determining group usage statistics. For example, the system may generate a table that combines the values associated with each user for each of the usage statistics (e.g., punctuation, lexicon, grammar, spelling, religion, swearing, slang, etc.).

At block 208, the system determines community characteristics based at least in part on the group usage statistics. In various embodiments, server device 302 of the system may perform this step of determining community characteristics. Over time, the system learns the community characteristics, which includes group usage statistics and a collaboration type.

In various embodiments, the community characteristics are further based at least in part on a collaboration type. In some embodiments, the collaboration type may be a topic with which the message is associated. For example, collaboration types or topics may include any topic such as networking, photos, cycling, etc. In various embodiments, the community characteristics are further based at least in part on one or more of a destination. In various embodiments, the community characteristics are further based at least in part on one or more of a style.

In some embodiments, the system checks messages and or documents in one or more repositories. The system also determines from the content characteristics, including individual usage statistics, if a new message is likely to end up in a particular repository or repositories. If so, the system checks the community characteristics associated with the messages and/or documents stored in the particular repository or repositories. For example, the system checks if the community characteristics call for formal language. As such, the system may recommend more formal language if the message contains informal language.

In various embodiments, the community characteristics may also include other behavioral patterns associated with the group of the given community. Example embodiments directed to community characteristics, group usage statistics, and collaboration type are described in more detail below.

Over time, the community characteristics inform the system of the potential destination (e.g., repository or repositories, etc.) of a given message, and the behavior or characteristics of the conversations in the collaboration environment. As such, when new users join the community and start contributing, the system recommends and promotes message wording the complies with expected norms and behaviors of that community.

From the community characteristics, over time, the system ascertains the purpose of each community or collaboration space in the collaboration environment. The system also ascertains each topic, the overall tone, and the relationships in each independent or private conversation, which may include two or more users. Note that private conversations are separate from conversations that are part of the community or collaboration space mentioned above. The system also ascertains the level of participation of individual users and groups of users in the collaboration environment. The system also determines the likelihood of a private conversation ending up in a corresponding community or collaboration environment.

At block 210, the system provides one or more recommendations to one or more users who write new messages based at least in part on the community characteristics and based at least in part on one or more recommendation policies. In some embodiments, a recommendation may come in several forms. The particular form of the recommendation may vary, and will depend on the particular implementation. For example, in some embodiments, a recommendation may be in a simple bubble window with the recommendation (e.g., "This sentence should be more formal."). In some embodiments, the system may provide a button for fixing a portion of the message (e.g., "Do you want to automatically change this? Yes? No?"). In some embodiments, the system may highlight with a red background if some portion needs correcting. In various embodiments, the system provides tone and writing style recommendations when a conversation is stored and/or shared on a given topic/purpose in the collaboration environment.

In various embodiments, at least one of the recommendation policies is to flag inappropriate wording detected in the new message. For example, the wording in the message might be inappropriate wording for the online community based on the community characteristics of the collaboration environment. In various embodiments, at least one of the recommendation policies is to suggest appropriate wording in the at least one new message. Such appropriate wording may be based at least in part on the community characteristics of the collaboration environment. In various embodiments, at least one of the recommendation policies is to suggest appropriate wording based on the community characteristics.

In various embodiments, the system provides one or more recommendations to a user while a user is writing and before sending. In some embodiments, the system may provide one or more recommendations after the user sends the message. While it may be too late for the particular message that was already sent, it will be helpful for future messages. In some implementations, the system may provide the user with the ability to manually check a given message before sending the message out. For example the system may provide a check button that to user can select while or right after completing a message. After the user selects the check button, the system may provide a recommend for changes or many indicated that the message complies with the recommendation policies.

In various embodiments, the system builds an understanding of the expected behavior and avoidances. As such, if there are users whom the system determines to be uneasy with a particular discussion or to be from countries that do not tolerate jokes or slang, the system may flag these as unacceptable/undesirable behaviors. When a new user is typing/compiling content which the system believes will end up in a given community in the collaboration environment, the system may promote the behavior in order to fast-track more positive responses.

In some embodiments, the system may use a weighting system based on current online users as to what behaviors are required or tolerated at that time of day. For example, if the community characteristics strongly indicate formal language, the system may give more weight to the formality of the language. Similarly, if the community characteristics strongly indicate that slang or swearing is highly inappropriate, the system may give more weight to avoiding slang or swearing.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

FIG. 5 is a table 500 showing example recommendation based on the community characteristics, according to some embodiments. In some embodiments, the system generates table 500 when there are at least two users communicating with each other. In some embodiments, the system may generate table 500 in real-time when a single user begins to type out a message.

As shown, the collaboration type taxonomy (labeled "collaboration type taxonomy") is "Cycling." The terms collaboration type and topic can be used interchangeably.

The aggregated match to exemplar is "http://www.ilovebicycling.com/downhill-mountain-biking-risks-are-they-worth-it/". In some embodiments, if the user wants more information, the user may click on the link associated with "Aggregated Match To Exemplar." In some embodiments, the link may show example language for the user to study.

The likely destination is "City Cycling Club and Wild." In various embodiments, the system looks at all available destination repositories, which the system has categorized. The system determines the likely repository to receive the message.

The proximate content style is "casual." In various embodiments, the system determines the style from the community characteristics. For example, the style may be formal, casual, etc. In this example, the style is casual. In some embodiments, the proximate content style is the style of the documents in the repository.

The number of proximate documents analyzed is "8,990." In various embodiments, the system analyzes all of the documents in a given repository. In this example, there are 8,990 documents. In some embodiments, the proximate documents are the documents in the repository, which the system determines to be relevant to the message based on key words in the text of the message.

The collaboration threshold real-time monitoring is "93%." In some embodiments, the longer the users have been having the conversation, the confidence level increases as far as the recommendation being appropriate for the message. For example, 10 seconds into the chat, a user may state, "Hi, How was your weekend? Listen, I have a general question about cycling." The recommendation may be at a 40% confidence level. After 2 or 3 minutes, the confidence level may increase to 93% once the user starts asking the question.

The recommendation is "This sentence should be more formal because this content will likely be saved for viewing in the Cycling wild XYZ."

The statistical likelihood is "96%." In some embodiments, the statistical likelihood percentage is the likelihood that the recommendation is accurate.

The User ID is "User 59." As such, the system sends the recommendation to User 59. Depending on the implementation, the system may provide tags and/or links from each message or post in the community to the original source.

In various embodiments, the system performs real-time monitoring of the conversation. An example recommendation that the system sends to the user may be, for example, "This sentence should be more formal because this content will likely be saved for viewing in the Cycling Wiki XYZ."

In various embodiments, the recommendation policies enforce sets of rules such that communications are appropriate for a particular community in the collaboration environment. In an example embodiment, the system cross references the style of writing in a given message through server device 302 using natural language processor 308 in order to determine if the content is suitable for other users in the collaboration environment. For example the system may determine that the use of some acronyms such as "LOL" (laugh out loud) and smiley emoticons are not be acceptable to users in certain communities (cultural etiquette). As such, the system will offer one or more recommendations with alternative output for posting to the forum, which the users will need to accept in order to continue and be compliant.

In another example embodiment, if two users are having a two-way conversation (e.g., exchanging instant messaging in a chat), the system may determine the probable end destination of content based at least in part on the community characteristics. For example, the system may determine that the conversation is likely to end up in community XYZ as a saved conversation. Based on the understanding of the potential destination for the content, the system may promote the behavior of that community or proximate content to both users. The behavior may refer to writing styles. For example, the system may recommend the use of proper English and recommend not using slang. Note that the text of a message might not end up in the expected destination. As such, recommended changes may be rolled back after a period of time.

Figure 6:
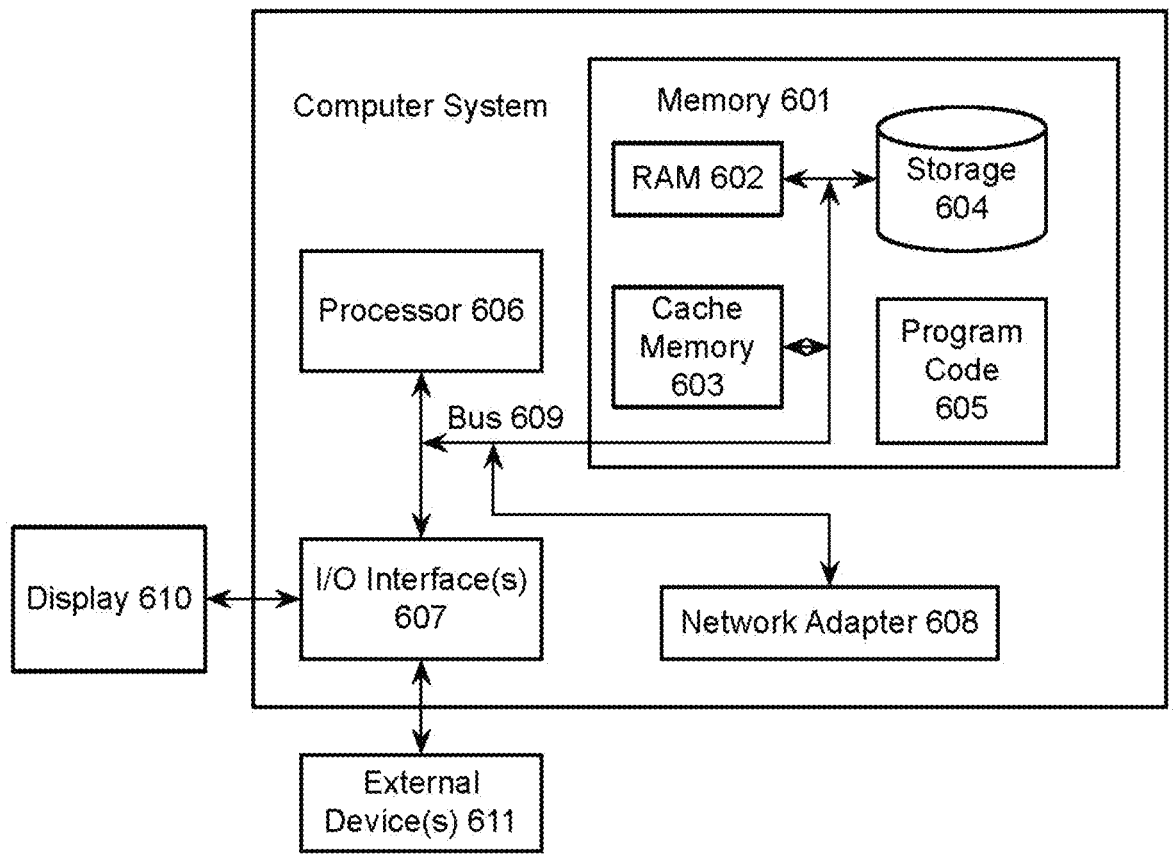
FIG. 6 is a block diagram of an example computer system, which may be used for embodiments described herein.

FIG. 6 is a block diagram of an example computer system 600, which may be used for embodiments described herein. The computer system 600 is operationally coupled to one or more processing units such as processor 606, a memory 601, and a bus 609 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 602 or cache memory 603, or storage 604, which may include non-volatile storage media or other types of memory. The memory 601 may include at least one program product having a set of at least one program code module such as program code 605 that are configured to carry out the functions of embodiment of the present invention when executed by the processor 606. The computer system 600 may also communicate with a display 610 or one or more other external devices 611 via input/output (I/O) interfaces 607. The computer system 600 may communicate with one or more networks via network adapter 608.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
at least one processor and a computer readable storage medium having program instructions embodied therewith, the program instructions executable by the at least one processor to cause the at least one processor to perform operations comprising:
monitoring content characteristics of messages provided by users in a collaboration environment, wherein the content characteristics include individual usage statistics;
aggregating the individual usage statistics;
determining group usage statistics from the aggregated individual usage statistics;
detecting at least one new message being written by a first user to one or more second users of the users in the collaboration environment;
accessing a plurality of destination repositories;
determining content characteristics of messages and documents stored at each destination repository of the plurality of destination repositories;
identifying at least one first destination repository of the plurality of destination repositories that is a candidate destination repository to receive the at least one new message, wherein the identifying of the at least one first destination repository is based at least in part on the content characteristics associated with the at least one new message and content characteristics associated with the at least one first destination repository and based at least in part on individual usage statistics associated with the first user and the one or more second users;
determining community characteristics associated with the at least one first destination repository based at least in part on the group usage statistics, wherein the community characteristics comprise one or more communication channels associated with the at least one first destination repository; and
providing one or more recommendations to the first user with regard to the at least one new message based at least in part on the community characteristics and based at least in part on one or more recommendation policies.

2. The system of claim 1, wherein the community characteristics are further based at least in part on a destination.

3. The system of claim 1, wherein the individual usage statistics comprises statistics associated with one or more of punctuation, lexicon, grammar, spelling, religion, swearing, and slang.

4. The system of claim 1, wherein the community characteristics are further based at least in part on a collaboration type.

5. The system of claim 1, wherein at least one of the recommendation policies is to flag inappropriate wording detected in the at least one new message.

6. The system of claim 1, wherein at least one of the recommendation policies is to suggest appropriate wording in the at least one new message.

7. The system of claim 1, wherein at least one of the recommendation policies is to suggest appropriate wording based on the community characteristics.

8. A computer program product comprising a computer readable storage medium having program instructions embodied therewith, the program instructions executable by at least one processor to cause the at least one processor to perform operations comprising:
monitoring content characteristics of messages provided by users in a collaboration environment, wherein the content characteristics include individual usage statistics;
aggregating the individual usage statistics;
determining group usage statistics from the aggregated individual usage statistics;
detecting at least one new message being written by a first user to one or more second users of the users in the collaboration environment;
accessing a plurality of destination repositories;
determining content characteristics of messages and documents stored at each destination repository of the plurality of destination repositories;
identifying at least one first destination repository of the plurality of destination repositories that is a candidate destination repository to receive the at least one new message, wherein the identifying of the at least one first destination repository is based at least in part on the content characteristics associated with the at least one new message and content characteristics associated with the at least one first destination repository and based at least in part on individual usage statistics associated with the first user and the one or more second users;
determining community characteristics associated with the at least one first destination repository based at least in part on the group usage statistics, wherein the community characteristics comprise one or more communication channels associated with the at least one first destination repository; and
providing one or more recommendations to the first user with regard to the at least one new message based at least in part on the community characteristics and based at least in part on one or more recommendation policies.

9. The computer program product of claim 8, wherein the community characteristics are further based at least in part on one a destination.

10. The computer program product of claim 8, wherein the individual usage statistics comprises statistics associated with one or more of punctuation, lexicon, grammar, spelling, religion, swearing, and slang.

11. The computer program product of claim 8, wherein the community characteristics are further based at least in part on a collaboration type.

12. The computer program product of claim 8, wherein at least one of the recommendation policies is to flag inappropriate wording detected in the at least one new message.

13. The computer program product of claim 8, wherein at least one of the recommendation policies is to suggest appropriate wording in the at least one new message.

14. The computer program product of claim 8, wherein at least one of the recommendation policies is to suggest appropriate wording based on the community characteristics.

15. A computer-implemented method for recommending message wording in a collaboration environment, the method comprising:
- monitoring content characteristics of messages provided by users in a collaboration environment, wherein the content characteristics include individual usage statistics;
- aggregating the individual usage statistics;
- determining group usage statistics from the aggregated individual usage statistics;
- detecting at least one new message being written by a first user to one or more second users of the users in the collaboration environment;
- accessing a plurality of destination repositories;
- determining content characteristics of messages and documents stored at each destination repository of the plurality of destination repositories;
- identifying at least one first destination repository of the plurality of destination repositories that is a candidate destination repository to receive the at least one new message, wherein the identifying of the at least one first destination repository is based at least in part on the content characteristics associated with the at least one new message and content characteristics associated with the at least one first destination repository and based at least in part on individual usage statistics associated with the first user and the one or more second users;
- determining community characteristics associated with the at least one first destination repository based at least in part on the group usage statistics, wherein the community characteristics comprise one or more communication channels associated with the at least one first destination repository; and
- providing one or more recommendations to the first user with regard to the at least one new message based at least in part on the community characteristics and based at least in part on one or more recommendation policies.

16. The method of claim 15, wherein the community characteristics are further based at least in part on a destination.

17. The method of claim 15, wherein the individual usage statistics comprises statistics associated with one or more of punctuation, lexicon, grammar, spelling, religion, swearing, and slang.

18. The method of claim 15, wherein the community characteristics are further based at least in part on a collaboration type.

19. The method of claim 15, wherein at least one of the recommendation policies is to flag inappropriate wording detected in the at least one new message.

20. The method of claim 15, wherein at least one of the recommendation policies is to suggest appropriate wording in the at least one new message.

\* \* \* \* \*